(12) United States Patent
Miyagawa et al.

(10) Patent No.: US 7,514,021 B2
(45) Date of Patent: Apr. 7, 2009

(54) CONDUCTIVE RESIN FILM, COLLECTOR AND PRODUCTION METHODS THEREFORE

(75) Inventors: Michinari Miyagawa, Nagahama (JP); Takashi Imai, Nagahama (JP)

(73) Assignee: Mitsubishi Plastics, Inc., Tokyo (JP)

( * ) Notice: Subject to any disclaimer, the term of this patent is extended or adjusted under 35 U.S.C. 154(b) by 144 days.

(21) Appl. No.: 10/519,339

(22) PCT Filed: Jun. 24, 2003

(86) PCT No.: PCT/JP03/07961

§ 371 (c)(1),
(2), (4) Date: Aug. 15, 2005

(87) PCT Pub. No.: WO04/001772

PCT Pub. Date: Dec. 31, 2003

(65) Prior Publication Data

US 2006/0098382 A1  May 11, 2006

(30) Foreign Application Priority Data

Jun. 24, 2002  (JP)  ............................. 2002-182444
Sep. 30, 2002  (JP)  ............................. 2002-286799
Nov. 25, 2002  (JP)  ............................. 2002-341121

(51) Int. Cl.
*H01B 1/00*   (2006.01)

(52) U.S. Cl. ..................... 252/500; 361/502; 428/215; 428/195.1; 428/211.1; 428/400; 430/58.05; 399/159

(58) Field of Classification Search ................ 428/344, 428/349, 215, 211, 400, 195.1, 211.1; 252/500; 361/272, 502; 427/126.6; 399/159; 430/58.05
See application file for complete search history.

(56) References Cited

U.S. PATENT DOCUMENTS

| | | | | |
|---|---|---|---|---|
| 3,830,656 | A | * | 8/1974 | Takenaka et al. ............. 338/309 |
| 4,915,985 | A | * | 4/1990 | Maxfield et al. .......... 427/126.6 |
| 5,110,669 | A | * | 5/1992 | Knobel et al. ................ 428/215 |
| 5,124,075 | A | | 6/1992 | Yasuda et al. |

(Continued)

FOREIGN PATENT DOCUMENTS

JP    02-008052    *  1/1990

(Continued)

*Primary Examiner*—Mark Kopec
*Assistant Examiner*—Khanh Tuan Nguyen
(74) *Attorney, Agent, or Firm*—Knobbe Martens Olson & Bear, LLP

(57) ABSTRACT

There is disclosed a conductive resin film comprising a conductive substrate layer and a low-resistance layer with a volume resistance of 0.1 to 1.0 Ωcm including a fine carbon fiber and a resin in a thickness direction on at least one of its outermost layer. This film exhibits good conductivity even with a low mixing rate of the conductive material and good acid resistance.

8 Claims, 2 Drawing Sheets

U.S. PATENT DOCUMENTS

| | | | |
|---|---|---|---|
| 5,308,727 A * | 5/1994 | Osawa et al. | 430/58.05 |
| 5,458,967 A | 10/1995 | Kanno | |
| 5,682,288 A * | 10/1997 | Wani | 361/502 |
| 5,706,165 A * | 1/1998 | Saito et al. | 361/502 |
| 6,017,610 A * | 1/2000 | Abe et al. | 428/195.1 |
| 6,241,057 B1 * | 6/2001 | Hiatt | 188/219.1 |
| 6,294,257 B1 * | 9/2001 | Tsukakoshi et al. | 428/400 |
| 6,392,867 B1 * | 5/2002 | Yamada et al. | 361/502 |
| 6,522,523 B2 * | 2/2003 | Takatomi et al. | 361/502 |
| 6,654,229 B2 * | 11/2003 | Yanagisawa et al. | 361/502 |
| 6,671,165 B1 * | 12/2003 | Nakazawa et al. | 361/502 |
| 6,713,164 B1 * | 3/2004 | Hareyama et al. | 428/211.1 |
| 6,773,466 B1 * | 8/2004 | Hiratsuka et al. | 29/25.03 |
| 7,224,574 B2 * | 5/2007 | Fujino et al. | 361/502 |
| 2001/0026708 A1 * | 10/2001 | Ishii et al. | 399/159 |

FOREIGN PATENT DOCUMENTS

| | | | |
|---|---|---|---|
| JP | 4-174599 A | | 6/1992 |
| JP | 5-206680 A | | 8/1993 |
| JP | 7-102112 | | 4/1995 |
| JP | 09-107195 | * | 4/1997 |
| JP | 09-2008313 | * | 8/1997 |
| JP | 11-144737 A | | 5/1999 |
| JP | 11-297332 A | | 10/1999 |
| JP | 2000-012388 | * | 1/2000 |
| JP | 2001-76971 A | | 3/2001 |
| JP | 2001-168573 | * | 6/2001 |
| JP | 2002-124265 | * | 4/2002 |
| JP | 2005-238534 | * | 9/2005 |

* cited by examiner x 10,000 x 5,000

CONDUCTIVE RESIN FILM, COLLECTOR AND PRODUCTION METHODS THEREFORE

This application is the U.S. National Phase under 35 U.S.C. §371 of International Application PCT/JP2003/007961, filed on Jun. 24, 2003, which claims priority of Japanese Patent Applications No. 2002-182444 filed on Jun. 24, 2002, 2002-286799 filed on Sep. 30, 2002 and 2002-341121 filed on Nov. 25, 2002. The International Application was published under PCT Article 21(2) in a language other than English.

TECHNICAL FIELD

This invention relates to a monolayer or laminated resin film with improved conductivity; particularly, for example, a conductive resin laminated film comprising a low-resistance layer containing a fine carbon fiber with significantly higher corrosion resistance. This invention also relates to a process for manufacturing the conductive resin film and further relates to a collector used in an electric double layer capacitor.

BACKGROUND ART

In the field of electronics, major properties required for a polymer material include moldability, heat resistance, durability, high conductivity, corrosion resistance, recyclability and electromagnetic wave blocking effect, depending on a product and an application. In general, polymer materials used in this field include thermosetting resins such as epoxy resins and phenol resins; and engineering plastics such as polyphenylene oxides, liquid crystal polymers, polyimides and polycarbonates.

However, although a material generally having the above properties is strongly needed, producing such a material is generally difficult, often resulting in a disadvantageous cost. One of such required properties is higher conductivity, and in addition to the property, there is needed a polymer material further exhibiting good corrosion resistance.

Japanese Patent Publication No. 1991-77288 has proposed a fine carbon fiber with higher conductivity as a conductive material. However, when being combined with a resin, such a fine carbon fiber is less dispersible, leading to insufficient conductivity. Specifically, as described in Japanese Patent Laid-open Publication No. 1995-102112, a product obtained by blending a resin (80% by weight) with a fine carbon fiber (20% by weight) in a dry blending process and then molding the mixture by an extruder has a volume resistivity as high as about 1 $\Omega$, which is insufficient conductivity. Japanese Patent Laid-open Publication No. 1991-55709 has described a conductive sheet wherein a particular hollow carbon fibril is dispersed in an insulative polymer material, but it has an inadequate volume resistivity.

One of applications requiring conductivity and corrosion resistance is an electric double layer capacitor using an aqueous electrolytic solution. An electric double layer capacitor is an electric element consisting of a pair of polarizable electrodes, collectors and an electrolyte. Such capacitors can be generally classified into those comprising an organic solvent type electrolytic solution or an aqueous electrolytic solution.

Comparing these two types of capacitors, a capacitor comprising an aqueous electrolytic solution can generally give a lower output voltage than a capacitor comprising an organic solvent electrolytic solution, but it has larger ion conductivity in the electrolytic solution, so that an internal resistance of the capacitor may be reduced to give an advantageously larger output current. Furthermore, a capacitor comprising an aqueous electrolytic solution is advantageous in that handling thereof is easy from a view point of safety, because it does not comprise a flammable liquid as used in a capacitor comprising an organic solvent electrolytic solution, An electric double layer capacitor comprising an aqueous electrolytic solution has a configuration as shown in FIG. 1, where polarizable electrodes 2 are placed opposite each other via a separator 4, collectors 1 are placed outside of the individual polarizable electrodes 2 and are insulated by a gasket 3.

When using a plurality of capacitors are connected in series or in parallel for obtaining a higher output voltage in an electric double layer capacitor comprising an aqueous electrolytic solution, an internal resistance of the capacitor-composite as a whole may be increased, resulting in a lower output current. Thus, it has been desired to reduce an internal resistance of each capacitor as much as possible.

It is well-known that an internal resistance in each capacitor is generated from an aqueous electrolytic solution, polarizable electrodes, collectors and interfaces therebetween. Reduction of internal resistance in a capacitor has been conducted by, for example, reducing a volume resistance in the collector.

Commonly used collectors include conductive rubber films (for example, see Japanese Patent Laid-open Publication Nos. 2000-12388 and 1993-94925). These comprise a rubber containing conductive carbon and the like and have generally a volume resistance of about 10 to 100 $\Omega$cm. Thus, there have been needs for a material having a further lower volume resistance.

Additionally, an electric double layer capacitor comprising an aqueous electrolytic solution comprises an about 25 to 50% aqueous sulfuric acid solution as an electrolytic solution. A collector must be, therefore, also acid resistant.

A known example of the above collector is a conductive resin film in which a conductive material is a metal (see Japanese Patent Laid-open Publication No. 2000-12388), but it has a drawback that its conductivity is unstable under an acidic environment. When using a noble metal with good corrosion resistance as a conductive material, a cost becomes extremely higher, while a carbon-containing conductive material has lower conductivity than a metal, resulting in inadequate conductivity.

List of References

For a conductive resin film, Japanese Patent Publication No. 1991-77288 and Japanese Patent Laid-open Publication Nos. 1995-102112 and 1991-55709;

For an electric double layer capacitor, Japanese Patent Laid-open Publication Nos. 2000-12388 and 1993-94925.

DISCLOSURE OF THE INVENTION

An objective of an aspect of this invention is to provide a conductive resin film having good conductivity and acid resistance, and a process for manufacturing thereof.

An objective of another aspect of this invention is to provide a collector for an electric double layer capacitor, which has good conductivity and acid resistance.

A first aspect of this invention provides a conductive resin film comprising a low-resistance layer, a manufacturing process therefor and a collector produced thereby, and relates to the following items (1) to (8).

(1) A conductive resin film comprising a conductive substrate layer and a low-resistance layer with a volume resistance of 0.1 to 1.0 $\Omega$cm in a thickness direction as at least one of its outermost layer.

(2) The conductive resin film as described in the above (1), wherein a volume resistance of the low-resistance layer in a thickness direction is ⅕ or less of a volume resistance of the substrate layer in a thickness direction.

(3) The conductive resin film as described in the above (1) or (2), wherein the low-resistance layer is a layer in which the thermoplastic resin comprises a fine carbon fiber with a fiber diameter of 0.003 to 0.5 μm and a fiber length of 0.1 to 100 μm as a conductive agent.

(4) The conductive resin film as described in any of the above (1) to (3), wherein a thickness of the low-resistance layer is 1 to 50 μm.

(5) The conductive resin film as described in any of the above (1) to (4), wherein the substrate layer comprise a conductive agent selected from the group consisting of graphite powder, exfoliated graphite, carbon black, carbon fiber, carbon nanofiber, carbon nanotube, a metal carbide, a metal nitride, a metal oxide, metal fiber and metal powder.

(6) A process for manufacturing a conductive resin film having a low-resistance layer as at least one of its outermost layers, comprising the steps of applying a liquid composition of a fine carbon fiber and a thermoplastic resin in a solvent to a flat surface of a support, followed by drying or curing to form a coating film; placing the coating film over at least one side of a conductive substrate layer; and performing a lamination.

(7) A conductive resin film as described in any of the above (1) to (5) used as a collector for an electric double layer capacitor.

(8) A collector for an electric double layer capacitor comprising the conductive resin film as described in the above (7).

A second aspect of this invention provides a low-resistance monolayer conductive resin film, a manufacturing process therefor and a collector therewith, and relates to the following items (9) to (14).

(9) A conductive resin film comprising a thermoplastic resin containing a fine carbon fiber having a fiber diameter of 0.001 to 0.5 μm and a fiber length of 0.1 to 100 μm, wherein when a mixing volume ratio of the thermoplastic resin to the fine carbon fiber is expressed by the equation:

$$\text{Thermoplastic resin/Fine carbon fiber} = x/(100-x)$$

and a volume resistance of the film is y in Ωcm, a coordinate point (x,y) in a x-y plane is within a range enclosed by a quadrangle with four apices (50,0.01), (50,0.03), (90,0.1) and (90,0.5) including the lines and the apices.

(10) The conductive resin film as described in the above (9), wherein a thickness of the conductive resin film is 10 to 200 μm.

(11) A process for manufacturing a conductive resin film, comprising the steps of applying a liquid composition of a fine carbon fiber having a fiber diameter of 0.001 to 0.5 μm and a fiber length of 0.1 to 100 μm and a thermoplastic resin in a solvent to a flat surface of a support, followed by drying or curing to form a coating film; and then peeling the coating film from the support.

(12) A conductive resin film manufactured by the process as described in the above (11).

(13) The conductive resin film as described in any of the above (9), (10) and (12) used as a collector for an electric double layer capacitor.

(14) A collector for an electric double layer capacitor comprising the conductive resin film as described in the above (13).

A third aspect of this invention provides a collector with a low resistance and a higher tensile breaking strength, and relates to the following items (15) to (23).

(15) A collector for an electric double layer capacitor consisting of a conductive resin film comprising a thermoplastic resin containing a conductive agent, wherein the film has a volume resistance in a thickness direction of 0.01 to 5 Ωcm and a tensile breaking strength of 10 to 30 MPa as measured in accordance with JIS K7127.

(16) The collector for an electric double layer capacitor as described in the above (15), wherein the thermoplastic resin is selected from the group consisting of fluororesins, fluororubbers, polyolefins and polyolefin elastomers.

(17) The collector for an electric double layer capacitor as described in the above (15) or (16), wherein the conductive agent is selected from the group consisting of carbon nanotube, carbon nanofiber, a metal carbide and a metal nitride.

(18) The collector for an electric double layer capacitor as described in any of the above (15) to (17), wherein a volume ratio of the thermoplastic resin to the conductive agent is 50/50 to 90/10.

(19) The collector for an electric double layer capacitor as described in any of the above (15) to (18), wherein a thickness of the conductive resin film is 0.01 mm to 0.5 mm.

(20) The collector for an electric double layer capacitor as described in any of the above (15) to (19), wherein at least one side of the conductive resin film comprises a low-resistance layer.

(21) A process for manufacturing a collector for an electric double layer capacitor, comprising the steps of forming a conductive layer on a peelable support, placing the conductive layer with the support over at least one side of the conductive substrate layer to transfer the conductive layer, and peeling the support to form a low-resistance layer on the surface of the conductive resin film.

(22) A collector for an electric double layer capacitor manufactured by the process as described in the above (21).

(23) The collector for an electric double layer capacitor as described in any of the above (15) to (20) and (22), wherein the electric double layer capacitor comprises an aqueous electrolytic solution.

Figure 1:
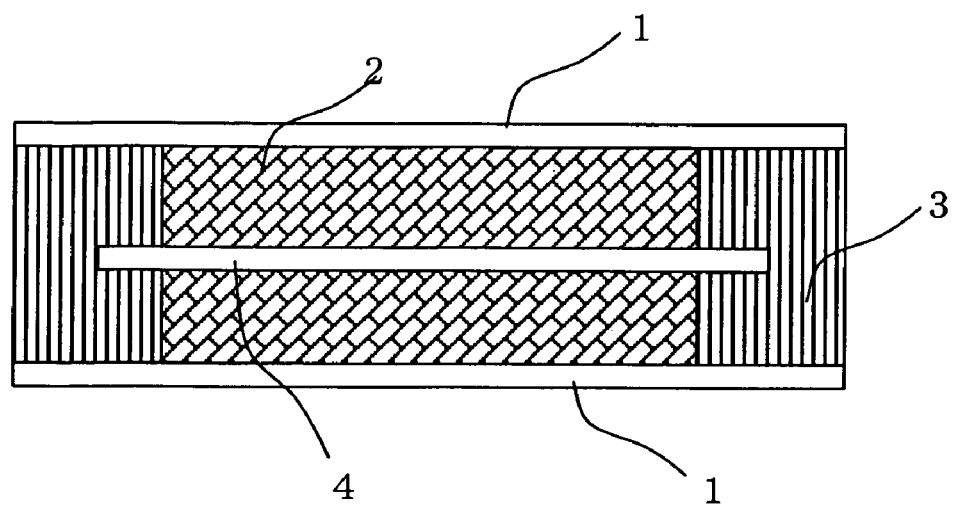
FIG. 1 shows an embodiment of an aqueous electric double layer capacitor.

In the drawings, the symbols have the following meanings; 1: collector, 2: polarizable electrode, 3; gasket, 4: separator, 11: brass electrode (having a gold-plated surface), 12: sample.

BEST MODE FOR CARRYING THE INVENTION

This invention will be described in detail.
In this invention, a volume resistance in a thickness direction is a value obtained by converting a resistance in a film thickness direction including a contact resistance of a surface into a volume resistance. Specific method of measurement will be described in Examples.

<<Description of Materials>>

<Resin as a Film Component>
A resin used for a film of this invention is preferably a thermoplastic resin. Examples of a thermoplastic resin include, but not limited to, polyolefin (PO) resins and polyolefin elastomers such as ethylene-containing homopolymers and copolymers; amorphous polyolefin resins (APO) such as cyclic polyolefins; polystyrene resins such as polystyrene (PS), ABS and SBS, and hydrogenated styrene elastomers such as SEBS; polyvinyl chloride (PVC) resins; polyvinylidene chloride (PVDC) resins; (meth)acrylate and (meth) acrylic resins such as polymethyl methacrylate (PMMA) and copolymerized acryls; polyester resins such as polyethylene terephthalate (PET); polyamide (PA) resins such as Nylon 6, Nylon 12 and copolymerized Nylons; polyvinyl alcohol resins such as polyvinyl alcohol (PVA) resins and ethylene-vinyl alcohol copolymers (EVOH); polyimide (PI) resins; polyetherimide (PEI) resins; polysulphone (PS) resins; polyethersulphone (PES) resin; polyamide imide (PAI) resins; polyether-ether ketone (PEEK) resins; polycarbonate (PC) resins; polyvinyl butyral (PVB) resins; polyalylate (PAR) resins; polyphenylenesulfide (PPS) resins; and fluororesins and fluoro-elastomers.

Among these thermoplastic resins, resins with good heat resistance and acid resistance are preferably used, including polyolefin (PO) resins and polyolefin elastomers, hydrogenated styrene elastomers such as SEBS, and fluororesins and fluoro-elastomers.

Examples of fluororesins and fluoro-elastomers may include at least one or more of fluororesins or fluoro-rubbers selected from the group consisting of PTFE (polytetrafluoroethylene), PFA (tetrafluoroethylene-perfluoroalkyl vinyl ether copolymer), FEP (tetrafluoroethylene-hexafluoropropylene copolymer), EPE (tetrafluoroethylene-hexafluoropropylene-perfluoroalkyl vinyl ether copolymer), ETFE (tetrafluoroethylene-ethylene copolymer), PCTFE (polychlorotrifluoroethylene), ECTFE (chlorotrifluoroethylene-ethylene copolymer), PVDF (polyvinylidene fluoride), PVF (polyvinyl fluoride), THV (tetrafluoroethylene-hexafluoropropylene-vinylidene fluoride copolymer), VDF-HFP (vinylidene fluoride-hexafluoropropylene copolymer), TFE-P (vinylidene fluoride-propylene copolymer), fluorine-containing silicone rubbers, fluorine-containing vinyl ether rubbers, fluorine-containing phosphazene rubbers and fluorine-containing thermoplastic elastomers.

Among these, PVDF, THV, VDF-HFP and TFE-P which contain vinylidene fluoride are particularly preferable in the light of moldability.

Examples of polyolefin resins and polyolefin elastomers may include at least one or more of polyolefins and polyolefin elastomers selected from the group consisting of polyethylene, polypropylene, polybutene, poly(4-methyl-1-pentene), polyhexene, polyoctene, hydrogenated styrene-butadiene rubbers, EPDM, EPM and EBM.

Among these, polyethylene, polypropylene, EPDM and hydrogenated styrene-butadiene rubbers are particularly preferable in the light of heat resistance and moldability.

<Conductive Agent>

A conductive agent used in this invention makes a resin film conductive.

Examples of a carbon conductive agent include graphite powders such as natural graphite, pyrolytic graphite and kish graphite; exfoliated graphite prepared by immersing the above-mentioned graphite in an acidic solution and then expanding it by heating; Ketjen Black, acetylene black and carbon black prepared by, for example, a furnace process; carbon fibers such as PAN-based type and pitch-based type; and carbon nanofiber, carbon nanotube and carbon nanohorn prepared by, for example, arc discharge, laser vaporization and vapor growth.

Examples of a metal carbide conductive agent include tungsten carbide, silicon carbide, zirconium carbide, tantalum carbide, titanium carbide, niobium carbide, molybdenum carbide, vanadium carbide, chromium carbide and hafnium carbide. Among others, tungsten carbide, titanium carbide and chromium carbide are particularly preferable for an application requiring conductivity and acid resistance.

Examples of a metal oxide conductive agent include metal oxides such as titanium oxide, rhutenium oxide and indium oxide.

Examples of a metal nitride conductive agent include metal nitrides such as chromium nitride, aluminum nitride, molybdenum nitride, zirconium nitride, tantalum nitride, titanium nitride, gallium nitride, niobium nitride, vanadium nitride and boron nitride. Among these, titanium nitride and zirconium nitride are particularly preferable for an application requiring conductivity and acid resistance.

Examples of a metal conductive agent include metal fibers such as iron fiber, copper fiber and stainless fiber; and metal powders such as titanium powder, nickel powder, tin powder, tantalum powder and niobium powder.

<First Aspect of the Invention: a Conductive Resin Film in which an Outermost Layer Comprises a Low-resistance Layer>

A conductive resin film according to the first aspect of the invention comprises a substrate layer and an outermost layer comprised of a low-resistance layer at least in one side. A volume resistance of the low-resistance layer, which is lower than that of the substrate layer, contributes significantly to reduce a contact resistance of the film with a contacting article (i.e. article or parts to which the film contacts). It also contributes to reduce an overall mixing percentage of the conductive agent in the film as a whole.

Particularly, when using the conductive resin film of this invention as a collector for an electric double layer capacitor, a contacting article is a carbon electrode or outer case (e.g., a stainless steel case). In such a case, a volume resistance of the low-resistance layer in the conductive resin film, which is lower than that of the substrate layer, contributes to reduce a contact resistance with a contacting article and thus to reduce an internal resistance of the electric double layer capacitor.

A volume resistance of the low-resistance layer in a thickness direction must be within a range of 0.1 to 1.0 Ωcm. If it is more than 1.0 Ωcm, adequate conductivity cannot be obtained. A volume resistance of the low-resistance layer in a thickness direction is ⅕ or less, preferably ⅛ or less of a volume resistance of the substrate layer in a thickness direction. If a volume resistance of the low-resistance layer in a thickness direction is more than ⅕ of a volume resistance of the substrate layer in a thickness direction, a contact resistance with a contacting article tends to be increased.

The low-resistance layer comprises a resin and a conductive agent. The resin is preferably a thermoplastic resin, which can be, depending on an application, appropriately selected from the thermoplastic resins listed in "Resin as a film component". Particularly preferred are polyolefin (PO) resins and polyolefin elastomers; hydrogenated styrene elastomers such as SEBS; and fluororesins and fluoro-elastomers with good heat resistance and acid resistance.

A conductive agent in the low-resistance layer is preferably a fine fiber, particularly carbon fiber, which exhibits good corrosion resistance and conductivity. A fiber diameter of the fine carbon fiber is 0.003 to 0.5 μm, preferably 0.08 to 0.2 μm, and its fiber length is 0.1 to 100 μm, preferably 1 to 50 μm for obtaining good conductivity. Examples of such a fine carbon fiber include carbon nanofiber and carbon nanotube and the like.

A mixing ratio of the resin (particularly, a thermoplastic resin) in the low-resistance layer to the fine carbon fiber may be appropriately selected such that a volume resistance of the low-resistance layer in a thickness direction come to be 0.1 to 1.0 Ωcm and ⅕ or less of a volume resistance of the substrate layer in a thickness direction. Preferably, a volume ratio of the thermoplastic resin to the fine carbon fiber is 15/85 to 85/15.

A thickness of the low-resistance layer is 1 to 50 μm, preferably 3 to 20 μm. If a thickness of the low-resistance layer is less than 1 μm, the layer is so thin that a pinhole tends to be formed in the low-resistance layer, leading to the presence of a portion having a larger volume resistance. If a thickness of the low-resistance layer is more than 50 μm, the conductive resin film tends to be fragile. The low-resistance layer may be formed on one or both of the sides of the substrate layer.

Next, there will be described a substrate layer in a conductive resin film.

A substrate layer is preferably a resin containing a conductive agent. The resin is preferably a thermoplastic resin, which can be, depending on an application, appropriately selected from the thermoplastic resins listed in "Resin as a film component". Particularly preferred are polyolefin (PO) resins and polyolefin elastomers; hydrogenated styrene elastomers such as SEBS; and fluororesins and fluoro-elastomers with good heat resistance and acid resistance.

A conductive agent which can be contained in the substrate layer may be selected from those listed in "Conductive agent". Particularly preferred an acid-resistant conductive agent such as a carbon conductive agent for an application requiring acid resistance.

A volume ratio of the thermoplastic resin to the conductive agent in the substrate layer is preferably, but not limited to, 30/70 to 90/10. If a volume ratio of the thermoplastic resin to the conductive agent is less than 30/70, a rate of the conductive agent is so high that fluidability of the resin may be inadequate to form thin film and the conductive resin film may be fragile. If a volume ratio of the thermoplastic resin to the conductive agent is more than 90/10, a rate of the conductive agent is too low to give adequate conductivity.

A thickness of the substrate layer may be appropriately selected depending on an application. Generally, a thickness of the conductive resin film with substrate layer and the low resistance layer combined is 5 μm to 0.5 mm, preferably 10 μm to 200 μm. A volume resistance of the conductive resin film as a whole in a thickness direction is 0.01 to 5 Ωcm, preferably 3 Ωcm or less.

There will be described a process for manufacturing a conductive resin film according to this aspect of the invention.

A substrate layer may be formed by a common process such as, but not limited to, extrusion molding and roll forming.

A low-resistance layer may be formed by, without limitation, the process, in which a liquid composition of a fine carbon fiber and a thermoplastic resin in a solvent is applied to a flat surface of a support, dried or cured to form a low-resistance layer film on the support. Then, the support is placed such that the low-resistance layer side faces at least one side of a preformed substrate layer. After laminating the substrate layer with the low-resistance layer by, for example, thermocompression bonding, the support is peeled off. In a liquid composition, a fine carbon fiber may be dispersed while a thermoplastic resin may be dissolved or partially or totally dispersed, preferably dissolved in a solvent.

The support may be selected from various known films; for example, polyesters, plycarbonates, triacetylcellulose, cellophane, polyamides, aromatic polyamides, polyimides, polyetherimides, polyphenylenesulfides, polysulfones, polyethersulfones and polypropylenes. For improving releasability between the low-resistance layer and the support, the support surface may be treated with a mold release such as a silicone. Among others, a polypropylene or polyester film is preferable because of its proper strength, workability and cost.

A thickness of the support may be 5 to 500 μm, preferably 10 to 300 μm. If it is less than 5 μm, a substrate film has insufficient strength to prevent corrugation while if it is more than 500 μm, the film becomes too sturdy to realize good handleability or workability.

A low-resistance layer according to this manufacturing process can exhibit good conductivity even when a rate of the fine carbon fiber is lower because the fine carbon fiber is evenly dispersed in the resin. In a conductive resin film of this aspect of the invention comprising the low-resistance layer as an outermost layer, the fine carbon fiber is exposed in the surface, resulting in a significantly reduced contact resistance with contacting article.

This manufacturing process has an advantage that a substrate layer can be formed by a common method with a good productivity such as extrusion molding and roll forming, resulting in elimination of the problems of film distortion, pinholes and residual solvents, easier formation of a thick film and a higher productivity. In other words, this manufacturing process can solve the problems in both film properties and electric properties.

This conductive resin laminated film is highly conductive and thus can significantly reduce a contact resistance with contacting article. Therefore, when being used as a member for, e.g., a storage device and an electric generator, it can dramatically reduce an internal resistance. Furthermore, since it is highly acid-resistant, it can be used particularly as a collector in an electric double layer capacitor comprising an aqueous electrolytic solution.

An electric double layer capacitor which can comprise this conductive resin film has, for example, a configuration as shown in FIG. 1. When low-resistance layers are formed on both sides of a substrate layer, its contact resistance with both polarizable electrode and external connection can be significantly reduced. Furthermore, when a low-resistance layer is formed on one side of a substrate layer, a contact resistance with one of the aboves can be significantly reduced.

<Second Aspect of the Invention: Monolayer Low-resistance Film>

A second aspect of this invention relates to a monolayer low-resistance conductive resin film. Specifically, it relates to a conductive resin film comprising a thermoplastic resin containing a fine carbon fiber having a fiber diameter of 0.001 to 0.5 μm and a fiber length of 0.1 to 100 μm, wherein when a mixing volume ratio of the thermoplastic resin to the fine carbon fiber is expressed by the equation:

$$\text{Thermoplastic resin/Fine carbon fiber} = x/(100 \cdot x)$$

and a volume resistance of the film is y in Ωcm, a coordinate point (x,y) in a x-y plane is within a range enclosed by a quadrangle with four apices (50,0.01), (50,0.03), (90,0.1) and (90,0.5) including the lines and the apices.

Thus, a volume mixing ratio of the thermoplastic resin to the fine carbon fiber is thermoplastic resin/fine carbon fiber=50/50 to 90/10. A volume resistance in a film with a volume mixing ratio of 50/50 is 0.01 to 0.03 Ωcm, and a volume resistance in a film with a volume mixing ratio of 90/10 is 0.1 to 0.5 Ωcm.

A conductive resin film according to this aspect of the invention is a novel film having a lower resistance, even if the amount of the fine carbon fiber contained is equal to that in a conventional film (for example, Japanese Patent Laid-open Publication No. 1995-102112).

A thermoplastic resin can be, depending on an application, appropriately selected from the thermoplastic resins listed in "Resin as a film component". Particularly preferred are polyolefin (PO) resins and polyolefin elastomers; hydrogenated styrene elastomers such as SEBS; and fluororesins and fluoro-elastomers with good heat resistance and acid resistance.

The fine carbon fiber in the thermoplastic resin preferably has a fiber diameter of 0.001 to 0.5 μm, preferably 0.005 to 0.3 μm and a fiber length of 0.1 to 100 μm, preferably 0.5 to 30 μm in the light of improved conductivity, and may be combined with another carbon conductive material as a conductive agent. Examples of such an additional carbon conductive material include artificial graphite, natural graphite, carbon black, exfoliated graphite, carbon fiber and short carbon fiber.

Such a film may be formed by a variety of methods, but preferably by a process where a liquid composition of a fine carbon fiber and a thermoplastic resin in a solvent is continuously applied to a flat surface of a peelable support by an appropriate method such as die coating, dried or cured, and a resulting coating film is peeled off from the support. In the liquid composition, the fine carbon fiber is dispersed while the thermoplastic resin may be dissolved or partially or totally dispersed, preferably dissolved in a solvent.

In a film formed by this process, the fine carbon fiber is more evenly dispersed in the film than a film formed by dry blending and then extrusion molding. Therefore, even a lower volume mixing ratio of the fine carbon fiber can adequately contribute to improving conductivity, resulting in a reduced internal resistance of the film. Furthermore, while a film formed by dry blending and then extrusion molding has a larger contact resistance with contacting article such as an electrode because of the presence of a resin skin layer in the film surface, a film formed by the above inventive process can significantly reduce a contact resistance with a contacting article such as an electrode because a portion of the fine carbon fiber is exposed in the film surface.

A thickness of a conductive resin film according to the second aspect of the invention is preferably 10 to 200 μm. If it is less than 10 μm, a film is so thin that it is easily broken or less handleable. If the film thickness is more than 200 μm, a volume resistance in a thickness direction tend to be increased.

Since this film is highly conductive, it can dramatically reduce an internal resistance, when used as a member for a storage device or an electric generator and the like. Furthermore, since it is highly acid-resistant, it can be used particularly as a collector in an electric double layer capacitor comprising an aqueous electrolytic solution, for example, as shown in FIG. 1.

<Third Aspect of the Invention: Collector for an Electric Double Layer Capacitor>

The third aspect of this invention relates to a collector for an electric double layer capacitor, where a volume resistance of the film in a thickness direction, i.e., in a direction perpendicular to the film surface is 0.01 to 5 Ωcm, preferably 0.01 to 3 Ωcm. The value less than 0.01 Ωcm is impossible to achieve in practice, and that more than 5 Ωcm is inadequate for a collector in performance. A tensile breaking strength as measured in accordance with JIS K7127 is 10 to 30 MPa, preferably 20 to 30M Pa. If it is less than 10 MPa, a collector is too weak for practical use. If it is more than 30 MPa, a collector is too hard and the handling becomes more difficult.

Although both low resistance and high tensile strength are properties required in a collector, there have been no collectors meeting both of these requirements. Some of the conductive resin films according to the first and the second aspect of the invention described above can be used as a collector in the third aspect of the invention.

A thermoplastic resin used in this embodiment may be selected from the thermoplastic resins described in "Resin as a film component". Particularly preferred are fluororesins, fluoro-elastomers, polyolefin resins and polyolefin elastomers. Particularly preferred are PVDF, THV, VDF-HFP and TFE-P which contain vinylidene fluoride in the light of moldability, and are polyethylene, polypropylene and EPDM in the light of heat resistance and moldability.

Examples of a conductive agent which can be suitably used in this aspect include carbon nanofiber, carbon nanotube and carbon nanohorn, metal carbides and metal nitrides.

Carbon nanotube and carbon nanofiber preferably have a fiber diameter of 0.001 to 0.5 μm, preferably 0.003 to 0.2 μm and a fiber length of 1 to 100 μm, preferably 1 to 30 μm in the light of improving conductivity. The conductive agent may be combined with an additional carbon conductive agent. Examples of such an additional carbon conductive agent include artificial graphite, natural graphite, carbon black, exfoliated graphite and carbon fiber.

Preferred metal carbides are tungsten carbide, titanium carbide and chromium carbide exhibiting good conductivity and acid resistance. Preferred metal nitrides are titanium nitride and zirconium nitride exhibiting good conductivity and acid resistance.

A ratio of the thermoplastic resin to the conductive agent is 50/50 to 90/10 by volume, preferably 60/40 to 85/15 by volume. If a ratio of the thermoplastic resin to the conductive agent is less than 50/50 by volume, a rate of the thermoplastic resin is too low to properly conduct molding. If it is more than 90/10 by volume, a rate of conductive agent is too low to achieve good conductivity.

A thickness of the conductive resin film including the thermoplastic resin and the conductive agent is desirably 0.01 mm to 0.5 mm. If the film thickness is less than 0.01 mm, the film is fragile and easily broken, leading to poor handleability. If the thickness is more than 0.5 mm, a collector is so thick that an internal resistance in an electric double layer capacitor is increased and the size an electric double layer capacitor is increased.

The conductive resin film for a collector may be manufactured by, but not limited to, a common extrusion molding or roll forming process. For example, a thermoplastic resin and a conductive agent are premixed by an appropriate apparatus such as a twin screw extruder, and the mixture may be processed by extrusion molding or roll forming to form a conductive resin film. As described in "the Second Aspect", a film may be formed by applying the mixture to a flat surface of a peelable support, drying or curing, and then peeling a film from the support.

When using such a conductive resin film as a monolayer, a collector satisfying both volume resistance of 0.01 to 5 Ωcm and tensile breaking strength of 10 to 30 MPa can be provided by properly selecting a resin and a conductive agent as well as, for example, a mix proportion thereof.

In order to further reduce a contact resistance with an electrode, it is preferable to form a low-resistance layer on at least one side of the conductive resin film.

A low-resistance layer may be formed by forming a resin layer containing a conductive agent on a conductive resin film surface or burying a conductive agent in a conductive resin film surface. Examples of a conductive agent may include carbon conductive agents, metal carbide conductive agents and metal nitride conductive agents as described in "Conductive agent". Specifically, a dispersion of a conductive agent alone in a solvent or appropriately in combination with a thermoplastic resin, depending on the type of the conductive agent used (preferably, the resin is dissolved) is applied to a peelable support, dried or cured to form a conductive agent layer. After transferring it to a conductive substrate layer, (a conductive resin film separately formed), the support is peeled off and a low-resistance layer is attached to form the low-resistance layer. The support may be a polyester film and the like.

An example of such a collector having a low-resistance layer in its surface is a conductive resin film comprising a low-resistance layer as described in the first aspect, that is, a layer having a volume resistance of 0.1 to 1.0 Ωcm on the outermost layer in the substrate layer. Depending on the type of a conductive agent, for example a particulate agent such as tungsten carbide may be buried in a surface (a thermoplastic resin may be added as a binder).

A collector comprising a conductive resin film having a low-resistance layer in its surface has an advantage that since a conductive agent is dispersed in the surface with a higher density, a volume resistance of the overall film in a thickness direction can be reduced. Thus, since a relatively lower amount of a conductive material contained in a substrate layer may give sufficient conductivity to the collector, both requirements of a lower resistance and a higher tensile breaking strength can be achieved.

EXAMPLES

This invention will be described with reference to, but not limited to, Examples.

<Measuring Methods of a Volume Resistance in a Thickness Direction>

A volume resistance of a layer or film in this example in a thickness direction (a direction perpendicular to a film surface) was evaluated as follows.

1. Measuring Apparatus

Resistance meter: Type YMR-3 (Yamasaki-seiki Co., Ltd.)
Loading device: Type YSR-8 (Yamasaki-seiki Co., Ltd.)
Electrodes: Two brass plates (Area: 6.45 cm², mirror finished, gold-plated surface).

2. Measurement Conditions

Method: Four terminal method
Applied current: 10 mA (alternating current, 287 Hz)
Open-terminal voltage: 20 mV peak or less
Load (pressure): 1.8 MPa (18.6 kgf/cm²).

3. Measuring Method

Figure 2:
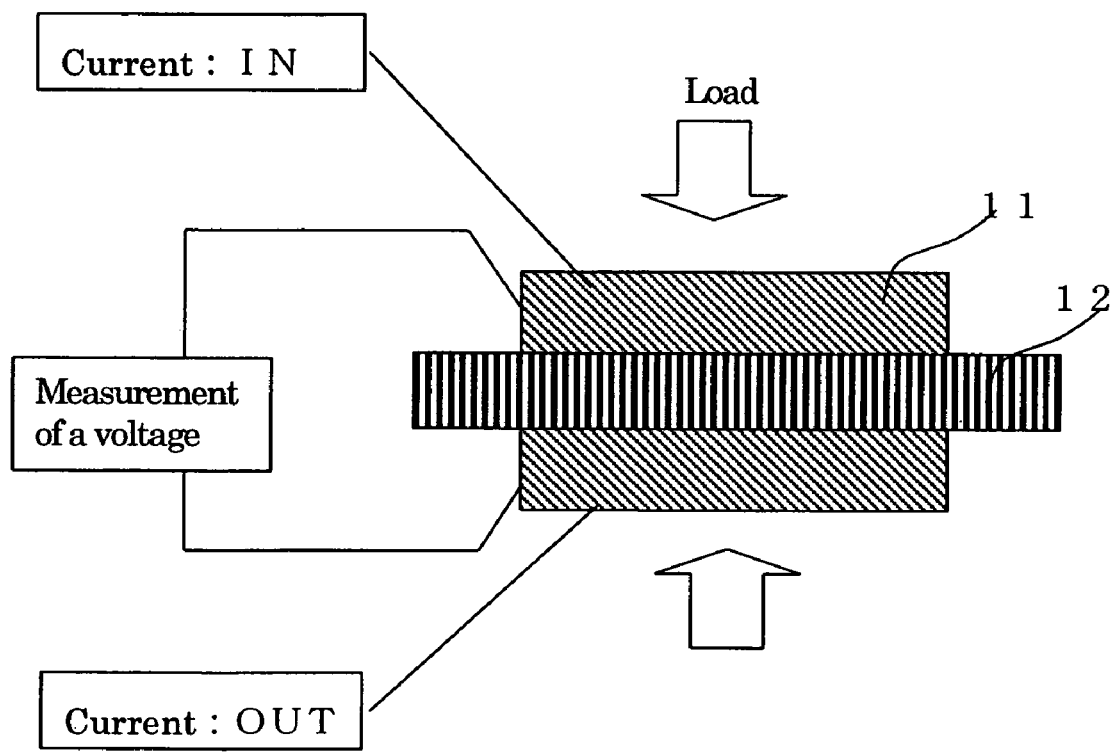
FIG. 2 schematically shows an apparatus for measuring a volume resistance in a thickness direction.

Using the measuring apparatus as shown in FIG. 2, a measured sample 12 was sandwiched by brass electrodes 11, and while applying a given load (pressure), a voltage at a given current was determined by a four-terminal method.

4. Method for Calculating a Volume Resistance

From the resistance R (Ω) as determined by the above method, an electrode area (6.45 cm²) and a sample thickness t (cm), a volume resistance in a thickness direction can be calculated by the equation:

Volume resistance in a thickness direction (Ωcm)=$R \times (6.45\ cm^2/t)$.

Examples of the First Aspect

<Formation of a Substrate Layer>

A thermoplastic resin and a conductive agent were mixed by a twin screw extruder (an extruder temperature: 230° C.) in a ratio described in Table 1.

The resulting mixture was extruded from a nozzle by a single screw extruder (an extruder temperature: 230° C.) to form a conductive substrate film.

All of the resulting substrate films have a thickness of 100 μm, and volume resistances in a film thickness direction are shown in Table 1.

The thermoplastic resins and the conductive agents in Table 1 are as follows.

1. Polyolefin Elastomer

"T310E", Idemitsu Kosan Co., Ltd., specific gravity: 0.88

2. Styrene Elastomer

"Tuftec H1041", Asahi Kasei Corporation, specific gravity: 0.91

3. Fluoro-elastomer

"THV220G", Sumitomo 3M Ltd., specific gravity: 2

4. Carbon Black

Ketjen Black, Lion Corporation, specific gravity: 1.5

5. Artificial Graphite Powder

"UFG-30", Showa Denko K.K., specific gravity: 2.2

6. Titanium Carbide

"Titanium carbide", Allied Material Corp. specific gravity: 4.9

<Formation of Low-resistance Layer A>

SEBS (Tuftec H1041, Asahi Kasei Corporation, specific gravity: 0.91) and a fine carbon fiber ("Vapor deposition carbon fiber VGCF", Showa Denko K.K., specific gravity: 2) in a ratio of 60/40 were mixed in THF (tetrahydrofuran) such that a solid concentration was 8 wt %, to prepare a dispersion.

The fine carbon fiber used had a fiber diameter of 150 nm, a fiber length of 10 to 20 μm, a bulk specific gravity of 0.035 g/cc and a true specific gravity of 2.0 g/cc.

The dispersion was applied on a support (polypropylene film: thickness=50 μm) using a bar coater (Matsuo Sangyo Co. Ltd., No. 70) and dried at 80° C. to form a laminate of support and low-resistance layer.

Low-resistance layer A was removed from the resulting laminate of support-low-resistance layer composite. Low-resistance layer A was measured for its thickness and volume resistance, giving a thickness of 20 μm and a volume resistance in a thickness direction of 0.94 Ωcm.

<Formation of Low-resistance Layer B>

A fluoro-elastomer (THV220G, Sumitomo 3M Ltd., specific gravity: 2) and a fine carbon fiber ("Vapor deposition carbon fiber VGCF", Showa Denko K.K., specific gravity: 2) in a volume ratio of 60/40 were mixed in MIBK (methyl isobutyl ketone) such that a solid concentration was 8 wt %, to prepare a dispersion.

The fine carbon fiber used had a fiber diameter of 150 nm, a fiber length of 10 to 20 μm, a bulk specific gravity of 0.035 g/cc and a true specific gravity of 2.0 g/cc.

The dispersion was applied on a support (polypropylene film: thickness=50 μm) using a bar coater (Matsuo Sangyo Co. Ltd., No. 70) and dried at 80° C. to form a laminate of support-low-resistance layer composite.

Low-resistance layer B was removed from the resulting laminate of support-low-resistance layer composite. Low-resistance layer B was measured for its thickness and volume resistance, giving a thickness of 20 μm and a volume resistance in a thickness direction of 0.73 Ωcm.

Examples 1 to 6

<Formation of a Conductive Resin Laminate Film>

The substrate film prepared as described above and low-resistance layer A and/or B in a combination described in Table 2 were placed in the sequence of (low-resistance layer)/(substrate layer)/(low-resistance layer), and laminated by hot press to form a conductive resin laminate film.

The hot-press conditions were a heating temperature of 140° C. and a pressure of $4.9 \times 10^6$ Pa (50 kgf/cm$^2$).

The conductive resin laminate films thus obtained had a thickness of 130 μm and a volume resistance in a thickness direction shown in Table 2.

TABLE 1

|  | Resin composition (volume %) | Conductive agent (volume %) | Volume resistance |
|---|---|---|---|
| Substrate 1 | Polyolefin elastomer (88%) | Carbon black (12%) | 8.2 Ωcm |
| Substrate 2 | Styrene elastomer (88%) | Carbon black (12%) | 29.8 Ωcm |
| Substrate 3 | Polyolefin elastomer (40%) | Artificial graphite powder (60%) | 20.2 Ωcm |
| Substrate 4 | Styrene elastomer (40%) | Artificial graphite powder (60%) | 16.5 Ωcm |
| Substrate 5 | Polyolefin elastomer (65%) | Titanium carbide (35%) | 50.3 Ωcm |
| Substrate 6 | Fluro-elastomer (70%) | Titanium carbide (30%) | 41.1 Ωcm |

TABLE 2

|  | Substrate layer | Low-resistance layer | Volume resistance |
|---|---|---|---|
| Example 1 | Substrate 1 | Low-resistance layer A | 1.66 Ωcm |
| Example 2 | Substrate 2 | Low-resistance layer A | 2.41 Ωcm |
| Example 3 | Substrate 3 | Low-resistance layer A | 1.87 Ωcm |
| Example 4 | Substrate 4 | Low-resistance layer A | 1.76 Ωcm |
| Example 5 | Substrate 5 | Low-resistance layer A | 2.01 Ωcm |
| Example 6 | Substrate 6 | Low-resistance layer B | 1.89 Ωcm |

The results in Table 2 shows that a conductive resin laminate film comprising a low-resistance layer formed according to the process of this invention has a considerably lower volume resistance in a film thickness direction, i.e., better conductivity, than that in the conductive film without a low-resistance layer in Table 1.

Figure 3A:
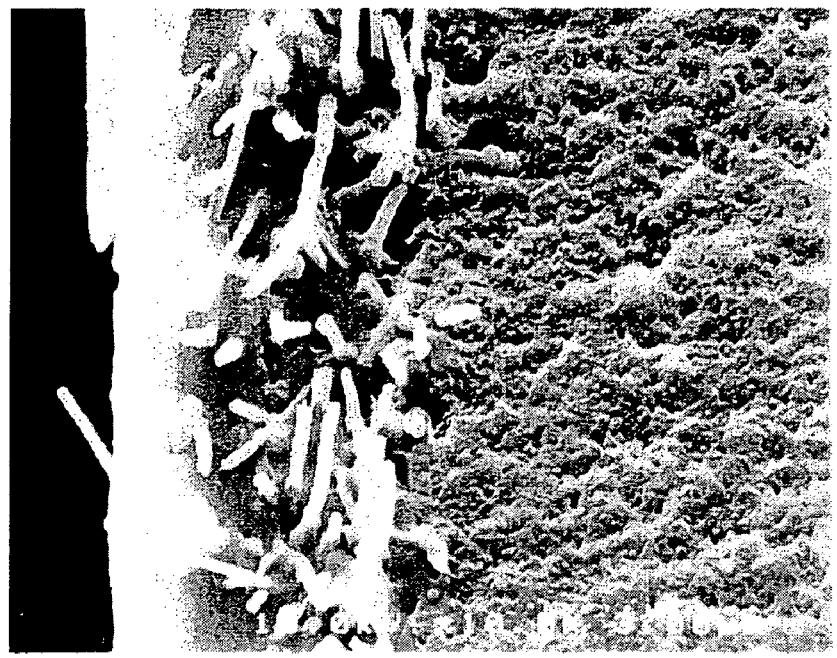
FIGS. 3A and 3B are SEM images of a cross-section and a surface of a conductive resin film whose surface is comprised of a low-resistance layer comprising a fine carbon fiber as a conductive agent, respectively.
Figure 3B:
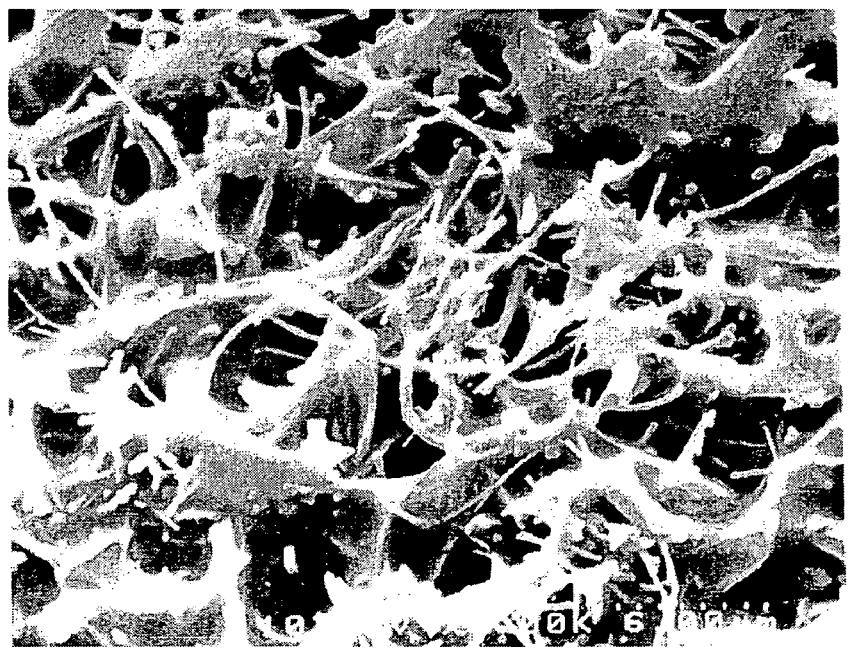

FIGS. 3A and 3B are SEM images of a cross-section and a surface of a conductive resin whose surface has a low-resistance layer comprising a fine carbon fiber as a conductive agent, respectively. These may indicate that using a particular fine carbon fiber, a conductive agent is exposed in a surface and thus an opportunity of direct contact between a contacting article and the conductive agent is increased, resulting in a lower contact resistance.

Example of the Second Aspect

A fluoro-elastomer (THV220G, Sumitomo 3M Ltd., specific gravity: 2) and a fine carbon fiber ("Vapor deposition carbon fiber VGCF", Showa Denko K.K., specific gravity: 2) in a volume ratio of 50/50, 60/40, 70/30, 80/20 or 90/10 were mixed in MIBK (methyl isobutyl ketone) such that a solid concentration was 20 wt %, to prepare five dispersions.

The fine carbon fiber used had a fiber diameter of 150 nm, a fiber length of 10 to 20 μm, a bulk specific gravity of 0.035 g/cc and a true specific gravity of 2.0 g/cc.

Each of these five dispersions was applied on a polyester film with a thickness of 200 μm by die coating, dried in an oven furnace until a residual solvent concentration became 0.1% by weight or less, and then removing the polyester film, to give five conductive films. All of these five conductive films had a thickness of 100 μm.

Referential Example

As a reference example, a fluoro-elastomer (THV220G, Sumitomo 3M Ltd., specific gravity: 2) and a fine carbon fiber ("Vapor deposition carbon fiber VGCF", Showa Denko K.K., specific gravity: 2) in a volume ratio of 50/50, 60/40, 70/30, 80/20 or 90/10 were mixed in a twin screw extruder (a mixing temperature: 250° C.) and extruded from a nozzle in an attempt to form a conductive film. However, in the case of a volume ratio of fluororesin/fine carbon fiber of 50/50 or 60/40, the amount of the fine carbon fiber was too high to be mixed in the resin, and thus only three conductive films with a volume ratio of 70/30, 80/20 and 90/10 were prepared. All of these three conductive films had a thickness of 100 μm.

In these example and referential example, a resulting conductive film was measured for its volume resistance in accordance with JIS K 7194 by the following measuring method, which determines a volume resistivity of the whole film.

1. Measuring Apparatus
   Loresta HP (Mitsubishi Chemical Corporation)

2. Measuring Method
   Four-terminal four-probe method (ASP type probe)

3. Applied Current During Measurement
   100 mA

Table 3 shows volume resistance values measured by the above method.

TABLE 3

|  |  | Volume resistance of a conducive film | |
|---|---|---|---|
| Volume rate of a resin | Volume rate of a fine carbon fiber | Example | Referential Example |
| 50% | 50% | 0.02 Ωcm | A film could not be formed. |
| 60% | 40% | 0.05 Ωcm | A film could not be formed. |
| 70% | 30% | 0.08 Ωcm | 0.24 Ωcm |
| 80% | 20% | 0.11 Ωcm | 1.20 Ωcm |
| 90% | 10% | 0.27 Ωcm | 50 Ωcm |

As shown in Table 3, a conductive film comprising a fine carbon fiber formed by the process of this invention has a volume resistance within a range acceptable in this invention and has a considerably lower volume resistance, i.e., better conductivity, than that in a conductive film with the same composition formed by extrusion.

Examples of the Third Aspect

Example C-1

In a twin extruder (an extruder temperature=250° C.) were mixed 23 parts by weight (volume rate: 70%) of a fluororesin (THV220G, Sumitomo 3M Ltd., specific gravity: 2) and 77 parts by weight (volume rate: 30%) of a conductive filler (Tungsten carbide WC20, Allied Material Corp. specific gravity: 15.5).

The resulting mixture was extruded from a nozzle using a single screw extruder (an extruder temperature=250° C.), to form a conductive resin film. The resulting conductive resin film (Sample 1) had a thickness of 0.3 mm.

Example C-2

In a twin extruder (an extruder temperature=250° C.) were mixed 70 parts by weight (volume rate: 70%) of a fluororesin (THV220G, Sumitomo 3M Ltd., specific gravity: 2) and 30 parts by weight (volume rate: 30%) of a carbon nanotube (Vapor deposition carbon fiber VGCF, Showa Denko K.K., specific gravity: 2). The carbon nanotube had a diameter of 0.15 μm, a length of 1 to 20 μm and a bulk specific gravity of 0.04 g/cm$^3$.

The resulting mixture was extruded from a nozzle using a single screw extruder (an extruder temperature=250° C.), to form a conductive resin film. The resulting conductive resin film (Sample 2) had a thickness of 0.3 mm.

Comparative Example C-1

In a twin extruder (an extruder temperature=250° C.) were mixed 75 parts by weight (volume rate: 70%) of a fluororesin (THV220G, Sumitomo 3M Ltd., specific gravity: 2) and 25 parts by weight (volume rate: 30%) of a short carbon fiber (HTA-0040, TOHO TENAX Co., Ltd., specific gravity: 1.77). The short carbon fiber had a diameter of 4 to 7 μm, a length of 40 to 1,000 μM and a bulk specific gravity of 0.07 g/cm$^3$.

The resulting mixture was extruded from a nozzle using a twin screw extruder (an extruder temperature=250° C.), to form a conductive resin film. The resulting conductive resin film (Sample 3) had a thickness of 0.3 mm.

Comparative Example C-2

In a twin extruder (an extruder temperature=250° C.) were mixed 63 parts by weight (volume rate: 60%) of a fluororesin (THV220G, Sumitomo 3M Ltd., specific gravity: 2) and 37 parts by weight (volume rate: 40%) of a short carbon fiber (HTA-0040, TOHO TENAX Co., Ltd., specific gravity: 1.77). The short carbon fiber was as used in Comparative Example 1. The resulting mixture was extruded from a nozzle using a twin screw extruder (an extruder temperature=250° C.), to form a conductive resin film. The resulting conductive resin film (Sample 4) had a thickness of 0.3 mm.

A volume resistance in a thickness direction for the above sample films was determined as described in "Measuring methods of a volume resistance in a thickness direction".

A tensile breaking strength for the sample films was determined in accordance with IS K7127 as described below.

1. Tension Tester
   Universal testing machine
2. Test Temperature
   23° C.
3. Shape of a Test Piece
   Type 2 test piece
4. Testing Rate
   50.0 mm/min Table 4 shows the results of a volume resistance and a tensile breaking strength.

TABLE 4

| Example | Resin Name | Vol % | Conductive agent | Vol % | Volume resistance (Ωcm) | Tensile breaking strength (MPa) |
|---|---|---|---|---|---|---|
| Example C-1 Sample 1 | THV 220 | 70% | Tungsten carbide | 30% | 1.3 | 19.6 |
| Example C-2 Sample 2 | THV 220 | 70% | Carbon nanotube | 30% | 0.52 | 25.5 |
| Comparative Example C-1 Sample 3 | THV 220 | 70% | Short carbon fiber | 30% | 55 | 15.5 |
| Comparative Example C-2 Sample 4 | THV 220 | 60% | Short carbon fiber | 40% | 4.8 | 5.0 |

As shown in Table 4, Sample 1 comprising tungsten carbide and Sample 2 comprising carbon nanotube having a volume resistance of 0.01 to 5 Ωcm exhibited better conductivity than Sample 3 comprising short carbon fiber in a fluororesin. Sample 4 comprising more short carbon fiber in a fluororesin that Sample 3 has a lower volume resistance, but a lower tensile breaking strength. However, the conductive resin films of Sample 1 comprising tungsten carbide and Sample 2 comprising carbon nanotube which have a volume resistance within a range acceptable in this invention have a higher and sufficient tensile breaking strength of 10 to 30 MPa.

Example C-3

In this example, low-resistance layers were formed as surface layers.

Formation of a Low-resistance Layer

A fluoro-elastomer (THV220G, Sumitomo 3M Ltd., specific gravity: 2) and a fine carbon fiber ("Vapor deposition carbon fiber VGCF", Showa Denko K.K., specific gravity: 2) in a volume ratio of 55/45 were mixed in MIBK (methyl isobutyl ketone) such that a solid concentration was 8 wt %, to prepare a dispersion.

The fine carbon fiber used had a fiber diameter of 150 nm, a fiber length of 10 to 20 μm, a bulk specific gravity of 0.035 g/cc and a true specific gravity of 2.0 g/cc.

The dispersion was applied on a support (polypropylene film: thickness=50 μm) using a bar coater (Matsuo Sangyo Go. Ltd., No. 70) and dried at 80° C. to form a laminate of support-low-resistance layer composite.

A low-resistance layer was removed from the resulting laminate of support-low-resistance layer composite. Low-resistance layer B was measured for its thickness and volume resistance, giving a thickness of 20 μm and a volume resistance in a thickness direction of 0.65 Ωcm.

Formation of a Conductive Resin Film

The conductive resin film (Sample 3) obtained in Comparative Example C-1 was used as a substrate layer and the above low-resistance layer were placed in the sequence of low-resistance layer/substrate layer (Sample 3)/low-resistance layer, and laminated by hot press to form a conductive resin film comprising the low-resistance layer.

The hot-press conditions were a heating temperature of 140° C. and a pressure of $4.9 \times 10^6$ Pa (50 kgf/cm$^2$).

The conductive resin film thus obtained had a thickness of 330 μm, and its volume resistance in a thickness direction and tensile breaking strength are shown in Table 5.

TABLE 5

| Example | Substrate layer | Low-resistance layer | Volume resistance (Ωcm) | Tensile breaking strength (MPa) |
|---|---|---|---|---|
| Example C-3 | Sample 3 | Both sides | 4.1 | 15.4 |

As shown in Table 5, the formed film comprising a low-resistance layer in both sides of Sample 3 has a tensile strength substantially comparable to Sample 3 and a significantly lower volume resistance in a film thickness direction than Sample 3. Thus, it was a formed film meeting the requirements for both lower resistance and higher tensile breaking strength.

INDUSTRIAL APPLICABILITY

A conductive resin film according to this invention has a lower volume resistance particularly in a film thickness direction and improved corrosion resistance, and can be manufactured in a relatively lower cost. It can be, therefore, used in, for example, a collector for an electric double layer capacitor.

What is claimed is:

1. A conductive resin film constituted by laminated layers comprising:
    a conductive substrate layer;
    a low-resistance layer with a volume resistance of 0.1 to 1.0 Ωcm in a thickness direction as at least one of its outermost layer;
    each layer of the laminated layers being made of a thermoplastic resin and a conductive agent,
    wherein the substrate layer comprises a conductive agent selected from the group consisting of graphite powder, exfoliated graphite, carbon black, carbon fiber, carbon nanofiber, carbon nanotube, a metal carbide, a metal nitride, a metal oxide, metal fiber and metal powder;
    wherein the conductive substrate layer and the low-resistance layer comprise a thermoplastic resin selected from the group consisting of polyolefin resins, polyolefin elastomers, amorphous polyolefin resins, polystyrene resins, hydrogenated styrene elastomers, polyvinyl chloride resins, polyvinylidene chloride resins, (meth) acrylate, (meth)acrylic resins, polyetherimide resins, polysulphone resins, polyethersulphone resin, polyamide imide resins, polyalylate resins, fluororesins and fluoro-elastomers;
    wherein a volume resistance of the low-resistance layer in a thickness direction is ⅕ or less of a volume resistance of the substrate layer in a thickness direction, and a volume resistance of the conductive resin film as a whole in a thickness direction is 0.01 to 5 Ωcm; and
    wherein the low-resistance layer is a layer in which the thermoplastic resin comrprises a fine carbon fiber with a fiber diameter of 0.003 to 0.5 μm and a fiber length of 0.1 to 100 μm as a conductive agent.

2. The conductive resin film as claimed in claim 1, wherein a thickness of the low-resistance layer is 1 to 50 μm.

3. A process for manufacturing a conductive resin film as claimed in claim 1, comprising the steps of applying a liquid composition of a fine carbon fiber and a thermoplastic resin in a solvent to a flat surface of a support, followed by drying or curing to form a coating film; placing the coating film over at least one side of a conductive substrate layer made of a thermoplastic resin and a conductive agent; and performing a lamination.

4. A conductive resin film as claimed in claim 1 used as a collector for an electric double layer capacitor.

5. A collector for an electric double layer capacitor comprising the conductive resin film as claimed in claim 4.

6. The conductive resin film as claimed in claim 1, wherein the thermoplastic resin is selected from the group consisting of polyolefin resins, polyolefin elastormers, hydrogenated styrene elastomers, fluororesins and fluoro-elastomers.

7. The conductive resin film as claimed in claim 6, wherein the thermoplastic resin from fluororesins or fluoro-elastomers is selected from the group consisting of polyterafluoroethylene, tetrafluoroeethylene-perfluoroalkyl vinyl ether copolymer, tetrafluoroethylene-hexafluoropropylene copolymer, tetrafluoroethylene-hexafluoropropylene perfluoroalkyl vinyl ether copolymer, tetrafluoroethylene-ethylene copolymer, polychlorotrifluoroethylene, chlorotrifluoroethylene-ethylene copolymer, polyvinylidene fluoride, polyvinyl fluoride, tetrafluoroethylene-hexafluoropropylene-vinylidene fluoride copolymer, vinylidene fluoride-hexafluoropropylene copolymer, vinyliden fluoride-propylene copolymer, fluorine-containing silicone rubbers, fluorine-containing vinyl ether rubbers, fluorine-containing phosphazene rubbers abd fluorine-containing thermoplastic elastomers; and/or
    wherein the thermoplastic resin from polyolefin resins or polyolefin elastomers is selected from the group consisting of polyethylene, polypropylene, polybutene, poly(4-methyl-1-pentene), polyhexene, polyoctene, hydrogenated styrene-butadiene rubbers, EPDM, EPM and EBM.

8. The conductive resin film as claimed in claim 1, wherein the thermoplastic resin is selected from the group consisting polyvinylidene fluoride, tetrafluoroetyhylene-hexafluoropropylene-vinylidene fluoride copolymer, vinylidene fluoride-hexafluoropropylene, copolymer, vinylidene fluoride-propylene copolymer, polyethylene, polypropylene, EPDM and hydrogenated styrene-butadiene rubbers.

* * * * *

UNITED STATES PATENT AND TRADEMARK OFFICE
CERTIFICATE OF CORRECTION

PATENT NO.        : 7,514,021 B2
APPLICATION NO. : 10/519339
DATED             : April 7, 2009
INVENTOR(S)       : Michinari Miyagawa et al.

It is certified that error appears in the above-identified patent and that said Letters Patent is hereby corrected as shown below:

On the title page Item (54); Change "CONDUCTIVE RESIN FILM, COLLECTOR AND PRODUCTION METHODS THEREFORE" to --CONDUCTIVE RESIN FILM, COLLECTOR AND PRODUCTION METHODS THEREFOR--.

On the title page Item (56), page 2, Column 1, line 3; Under US. Patent Documents change "Kanno" to --Kanno et al.--.

Column 2, line 3; Change "solution," to --solution.--.

Column 7, line 46-47; Change "low resistance" to --low-resistance--.

Column 8, line 2; Change "plycarbonates," to --polycarbonates,--.

Column 8, line 47; Change "aboves" to --above--.

Column 8, line 59; Change "x/(100·x)" to --x/(100-x)--.

Column 15, line 53; Change "1,000 μM" to --1,000 μm--.

Column 16, line 64; Change "Go. Ltd.," to --Co. Ltd.,--.

Column 18, line 2; In Claim 1, change "polyalylate" to --polyarylate--.

Column 18, line 10; In Claim 1, change "comrprises" to --comprises--.

Column 18, line 29; In Claim 6, change "elastormers," to --elastomers,--,

Column 18, line 34; In Claim 7, change "tetrafluoroeethylene" to --tetrafluoroethylene--.

UNITED STATES PATENT AND TRADEMARK OFFICE
CERTIFICATE OF CORRECTION

PATENT NO. : 7,514,021 B2
APPLICATION NO. : 10/519339
DATED : April 7, 2009
INVENTOR(S) : Michinari Miyagawa et al.

It is certified that error appears in the above-identified patent and that said Letters Patent is hereby corrected as shown below:

Column 18, line 54; In Claim 8, change "tetrafluoroetyhylene" to --tetrafluoroethylene--.

Signed and Sealed this

Third Day of November, 2009

David J. Kappos
*Director of the United States Patent and Trademark Office*

UNITED STATES PATENT AND TRADEMARK OFFICE
CERTIFICATE OF CORRECTION

PATENT NO.        : 7,514,021 B2
APPLICATION NO. : 10/519339
DATED             : April 7, 2009
INVENTOR(S)      : Michinari Miyagawa et al.

It is certified that error appears in the above-identified patent and that said Letters Patent is hereby corrected as shown below:

On the title page Item (54) and at Column 1, lines 1 and 2; Change "CONDUCTIVE RESIN FILM, COLLECTOR AND PRODUCTION METHODS THEREFORE" to --CONDUCTIVE RESIN FILM, COLLECTOR AND PRODUCTION METHODS THEREFOR--.

On the title page Item (56), page 2, Column 1, line 3; Under US. Patent Documents change "Kanno" to --Kanno et al.--.

Column 2, line 3; Change "solution," to --solution.--.

Column 7, lines 46-47; Change "low resistance" to --low-resistance--.

Column 8, line 2; Change "plycarbonates," to --polycarbonates,--.

Column 8, line 47; Change "aboves" to --above--.

Column 8, line 59; Change "x/(100·x)" to --x/(100-x)--.

Column 15, line 53; Change "1,000 µM" to --1,000 µm--.

Column 16, line 64; Change "Go. Ltd.," to --Co. Ltd.,--.

Column 18, line 2; In Claim 1, change "polyalylate" to --polyarylate--.

Column 18, line 10; In Claim 1, change "comrprises" to --comprises--.

Column 18, line 29; In Claim 6, change "elastormers," to --elastomers,--.

Column 18, line 34; In Claim 7, change "tetrafluoroeethylene" to --tetrafluoroethylene--.

UNITED STATES PATENT AND TRADEMARK OFFICE
CERTIFICATE OF CORRECTION

PATENT NO.        : 7,514,021 B2
APPLICATION NO.   : 10/519339
DATED             : April 7, 2009
INVENTOR(S)       : Michinari Miyagawa et al.

It is certified that error appears in the above-identified patent and that said Letters Patent is hereby corrected as shown below:

Column 18, line 54; In Claim 8, change "tetrafluoroetyhylene" to

--tetrafluoroethylene--.

This certificate supersedes the Certificate of Correction issued November 3, 2009.

Signed and Sealed this

Twenty-fourth Day of November, 2009

David J. Kappos
*Director of the United States Patent and Trademark Office*